Nov. 3, 1970 R. V. QUINLAN ET AL 3,538,247

TIME-BANDWIDTH REDUCTION SYSTEM AND METHOD FOR TELEVISION

Filed Jan. 15, 1968 7 Sheets-Sheet 1

INVENTORS:
ROBERT V. QUINLAN,
EDWARD S. SMIERCIAK,

BY Hood, Gust & Irish

ATTORNEYS.

INVENTORS:
ROBERT V. QUINLAN,
EDWARD S. SMIERCIAK,
BY Hood, Gust & Irish
ATTORNEYS.

Nov. 3, 1970 R. V. QUINLAN ET AL 3,538,247

TIME-BANDWIDTH REDUCTION SYSTEM AND METHOD FOR TELEVISION

Filed Jan. 15, 1968 7 Sheets-Sheet 3

INVENTORS:
ROBERT V. QUINLAN,
EDWARD S. SMIERCIAK,
BY Hood, Gust & Irish
ATTORNEYS.

TIME-BANDWIDTH REDUCTION SYSTEM AND METHOD FOR TELEVISION

INVENTORS:
ROBERT V. QUINLAN,
EDWARD S. SMIERCIAK,
BY Hood, Gust & Irish
ATTORNEYS.

INVENTORS:
ROBERT V. QUINLAN,
EDWARD S. SMIERCIAK,
BY Hood, Gust & Irish
ATTORNEYS.

INVENTORS:
ROBERT V. QUINLAN,
EDWARD S. SMIERCIAK
BY Hood, Gust & Irish
ATTORNEYS.

TIME-BANDWIDTH REDUCTION SYSTEM AND METHOD FOR TELEVISION

Filed Jan. 15, 1968 7 Sheets-Sheet 7

INVENTORS:
ROBERT V. QUINLAN,
EDWARD S. SMIERCIAK,
BY Hood, Gust & Irish
ATTORNEYS.

United States Patent Office 3,538,247

Patented Nov. 3, 1970

3,538,247

TIME-BANDWIDTH REDUCTION SYSTEM AND METHOD FOR TELEVISION

Robert V. Quinlan, Ho-Ho-Kus, N.J., and Edward S. Smierciak, Fort Wayne, Ind., assignors to International Telephone and Telegraph Corporation, a corporation of Delaware Filed Jan. 15, 1968, Ser. No. 697,654
Int. Cl. H04n *7/10*
U.S. Cl. 178—7.1 36 Claims

ABSTRACT OF THE DISCLOSURE

A time-bandwidth reduction system and method for the television transmission of still, two-color images. The optical image to be transmitted is scanned in conventional fashion, but one line at a time, by a conventional camera tube, thereby providing a one-line video signal; scanning of the next line is not begun until all of the information in the previous line has been processed and transmitted. A synchronizing signal is inserted at the start of each one-line video signal, which is then inserted into and recirculated through a delay line thereby to provide a succession of delayed one-line video signals each having a synchronizing signal at its start. Circuitry is provided to detect the synchronizing signal in each delayed one-line video signal and to initiate a pulse counting operation in response thereto, and circuitry is provided to detect the first occurrence of a video signal having a predetermined level, such as black, in each delayed one-line video signal and to terminate the counting operation in response thereto, the pulse count therefore indicating the location in the respective one-line video signal of the first such video signal. This pulse count is converted to a digitally encoded signal for transmission. Meanwhile, the detected first video signal in each delayed one-line video signal is erased prior to the next recirculation of the one-line video signal through the delay line so that the second such video signal becomes the first video signal in the next successive delayed one-line video signal, the location-detection, digital encoding and erasing process then being successively repeated until the delayed one-line video signal contains no video signals having the predetermined level, for example, the delayed one-line video signal is all white. The absence of such a video signal in the delayed one-line video signal is sensed and the scan of the next line by the camera tube is initiated. Thus, for each successive delayed one-line video signal, the first video element, such as black, appearing after the respective delayed synchronizing signal is detected, its position information transmitted, and it is then erased so that on the next recirculation of the delayed one-line video signal through the delay line, the next successive video element is detected, its position information transmitted, and it is erased, and so on, until all of the video elements have been processed out of the line of scanned information.

At the receiving station, each digitally encoded transmitted signal is decoded to provide a corresponding pulse count. A line sweep and a pulse counting operation is initiated in response to each decoding operation. The line sweep is interrupted and a video element, such as black, stored in response to detection of coincidence between the decoded pulse count and the pulse count resulting from the pulse counting operation. The line sweep remains stationary until the next video element position is received and decoded, at which time the sweep is resumed until the next coincidence is detected, at which point the sweep is again stopped and another video element stored. Display of the received information may be by means of a conventional signal-to-image storage display tube.

BACKGROUND OF THE INVENTION

Field of the invention

This invention relates generally to television transmission systems and methods, and more particularly to a system and method for reducing the transmission time and/or bandwidth in bilevel, still television transmission.

Description of the prior art

There are numerous instances where it is desired to transmit two-color, still images, such as graphical and typewritten or printed information. Various facsimile systems have been employed for this purpose, however, such systems have been characterized by their extremely slow transmission time. Conventional real-time television systems employing fast scanning rates and a complete grey scale have also been employed, however, such system require an extremely broad band transmission facility, such as a microwave radio link or coaxial cable. Such wide-band transmission facilities are expensive and furthermore are not always readily available or feasible.

It is therefore desirable to provide a system and method for transmitting still, black and white television images over a narrow band facility, such as an ordinary telephone line. Various "slow-scan" television systems have been proposed to accomplish this objective, however, such systems have necessitated the employment of camera tubes having extremely long storage times.

Most graphical and printed or typewritten documents include a very substantial amount of redundant information, such as the background or "white" color upon which the contrasting or "black" intelligence information appears; a typical typewritten page contains over 80 percent "white" information. In order to provide faster transmission rates, and/or a narrower transmission bandwidth, various transmission time-bandwidth compression techniques have been proposed. In one type of such system, as described and illustrated in applications Ser. Nos. 385,626 and 496,910 of Robert V. Quinlan, both assigned to the assignee of the present application, two scanning speeds are employed, i.e., a slow scanning speed so that the minimum size "black" picture element provides a pulse of sufficient width to be transmitted within the bandwidth capabilities of the transmission facility, and a fast scanning speed for transmitting redundant information, such as long runs of "white" information. In another system, as described and illustrated in Application Ser. No. 421,308, now Pat. No. 3,384,709, of Robert V. Quinlan and assigned to the assignee of the present application, the amplitude levels or states of adjacent elements of successive groups of elements of the initial video signal are sampled and a coded signal unit is generated in response to each one of the groups of elements, each of the coded signal units have a different predetermined characteristic in response to a different combination of the amplitude levels of the sampled elements of a respective group. This system, however, requires the transmission of signals having a plurality of different levels.

In yet another system described and illustrated in application Ser. No. 411,288, now Pat. No. 3,461,231, of Robert V. Quinlan and assigned to the assignee of the present application, redundancy between two video signals appearing in adjacent scanning lines is employed, the two signals being compared and a third signal generated in response to a difference between the two signals. This system, however, requires a special camera tube in which two lines are simultaneously scanned. In still another system of transmission time-bandwidth reduction as described and illustrated in application Ser. No. 430,408, now Pat. No. 3,384,709, of Robert V. Quinlan and assigned to the assignee of the present application, the optical image is scanned at constant speed, one line at a time, the resulting one-line video signal being stored, the contents of the line examined, and an encoded transmission signal generated in response thereto. In that system, however, the encoding is provided by a plurality of different signal levels in the transmission signal.

The above-described systems employ either dual speed scanning rates with resultant complexity and the required use of a camera tube having a long storage time, or a special dual beam camera tube, and/or utilize a multilevel transmission signal with resultant increase in signal-to-noise ratio problems, particularly where ordinary telephone lines are employed for the transmission facility.

It is accordingly desirable to provide a time-bandwidth reduction system for the transmission of still, black and white television images, in which conventional constant-speed scanning is employed and bilevel transmission provided.

SUMMARY OF THE INVENTION

In accordance with the broader aspects of the invention, camera tube means is provided having line and frame scanning means and output circuit means for providing a time-based video signal. Selectively actuable line sweep generator means is provided coupled to the line scanning means for energizing the same to scan one line of an optical image thereby to provide on initial one-line video signal. Signal delay means is provided having a delay at least as long as the duration of the one-line video signal and having input and output ends, and recirculating circuit means is provided coupling the input and output ends of the delay means and forming a closed loop therewith for recirculating a signal therethrough. The output circuit means of the camera means is coupled to the recirculating circuit means so that a succession of delayed one-line video signals is provided following the initial one-line video signal. First means is provided for detecting the start of each one of the one-line video signals and second means is provided for detecting the first video signal having a predetermined level, such as "black" in each of the one-line video signals. Means are provided coupled to the first and second detecting means for generating a transmission signal having a characteristic responsive to the location of each such video signal with respect to the start of the respective one-line video signal, and means are provided for erasing each first video signal from each one-line video signal recirculated through the delay means so that the second video signal having the predetermined level becomes the first signal in the next successive delayed one-line video signal.

It is accordingly an object of the invention to provide an improved time-bandwidth reduction system and method for transmitting still, two-color television images.

A further object of the invention is to provide an improved time-bandwidth reduction system and method employing conventional constant-speed scanning and providing a bilevel transmission signal.

The above mentioned and other features and objects of this invention and the manner of attaining them will become more apparent and the invention itself will be best understood by reference to the following description of an embodiment of the invention taken in conjunction with the accompanying drawings, wherein:

DESCRIPTION OF THE PREFERRED EMBODIMENT TRANSMITTING STATION

Figure 1:
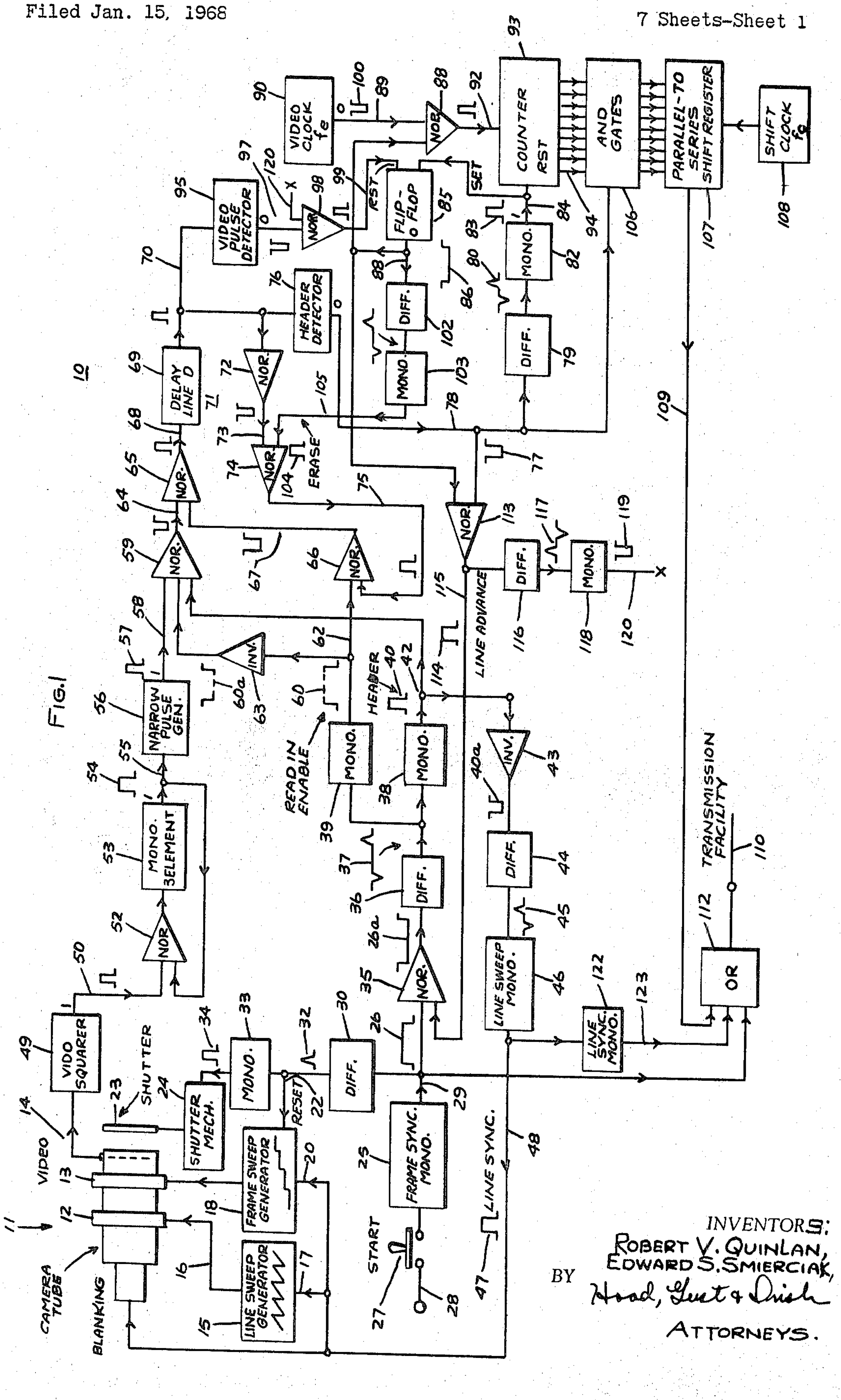
FIG. 1 is a schematic diagram illustrating the transmission station of the time-bandwidth reduction system of the invention.

Referring now to FIG. 1, there is shown the transmitting station of the system of the invention, generally indicated at 10A conventional camera tube 11 is provided, which may be a conventional vidicon tube, shown as having horizontal and vertical deflection coils 12, 13, it being understood that electrostatic rather than magnetic deflection may be employed. An output circuit 14 is provided coupled to the target electrode of the camera tube 11. A conventional triggered saw tooth line sweep generator 15 is provided having its output circuit 16 coupled to the horizontal deflection coil 12 and having a triggering signal input circuit 17; line sweep generator 15 generates one saw tooth waveform deflection signal in response to each triggering signal impressed on the input circuit 17. A conventional stairstep frame sweep generator 18 is provided having its output circuit 19 coupled to the vertical deflection coil 13 of the camera tube 11 and having a triggering signal input circuit 20 and a resetting signal input circuit 22. Frame sweep generator 18 provides a stairstep vertical or frame deflection voltage which is increased one step at a time in response to each triggering signal applied to its input circuit 20, the vertical deflection voltage provided by the frame sweep generator 18 being reset to its initial level by the application of a reset signal on its input circuit 22.

In the illustrated embodiment in which a vidicon camera tube is employed, a mechanical shutter 23 is provided for exposing the target electrode of the tube to the optical image to be transmitted, as is well-known to those skilled in the art, the shutter 23 being actuated by a conventional shutter mechanism 24.

The system of the invention, which is intended for the transmission of still, black and white images, is actuated to initiate transmission of a single image or picture by a frame synchronizing monostable multivibrator 25, which is actuated to generate a frame synchronizing signal 26 by a manually actuated "START" switch 27 coupled in its energizing circuit 28. Output circuit 29 of the monostable multivibrator 25 is coupled to a conventional differentiating circuit 30 which differentiates the leading edge of the frame synchronizing signal 26 to provide a pulse 32 which is applied to the reset input circuit 22 of the frame sweep generator 18 thereby to reset the vertical deflection voltage to its initial level preparatory to initiating an image transmission. Pulse 32 is also applied to monostable multivibrator 33 to actuate the same to generate a shutter-actuating pulse 34 which is applied to the shutter mechanism 24 to actuate shutter 23, thereby to expose the target electrode of the camera tube 11 to the image to be transmitted for a predetermined time.

Output circuit 29 of the monostable multivibrator 25 is also applied to a conventional NOR circuit 35 which inverts the frame synchronizing signal 26, as at **26*a*. The inverted signal 26*a* is applied to conventional differentiating circuit 36 which differentiates the trailing edge of the inverted signal 26*a* to provide a pulse 37 which is applied to monostable multivibrators 38, 39. The differentiated trailing edge pulse 37 actuates monostable multivibrator 38 to generate a line synchronizing signal or header pulse 40**.

Output circuit 42 of the monostable multivibrator 38 is coupled to conventional inverting circuit 43 which inverts the header 40, as at **40*a*. Differentiating circuit 44 differentiates the trailing edge of the inverted header 40*a* to provide differentiated pulse 45 which is applied to actuate the line sweep monostable multivibrator 46 thereby to generate a line synchronizing pulse 47 in its output circuit 48. Output circuit 48 of the line sweep monostable multivibrator 46 is coupled to the triggering signal input circuits 17 and 20 of the line and frame sweep generators 15 and 18. Thus, the line synchronizing pulse 47 actuates the line sweep generator 15 to initiate one saw tooth horizontal or line sweep deflection voltage, and likewise actuates frame sweep generator 18 to advance the vertical or frame sweep deflection voltage by one increment. Output circuit 48 of line sweep monostable multivibrator 46 may also be coupled to the camera tube 11 to apply the line synchronizing pulse 47 thereto as a blanking pulse. Thus, generation of each line synchronizing pulse 47 will result in actuation of the line and frame sweep generators 15 and 18 to scan one discreet line of an optical image and thereby generate an initial one-line video signal in output circuit 14 of the camera tube 11**.

Output circuit 14 of the camera tube 11 is coupled to a conventional video squaring circuit 49 which increases the sharpness of the "white" to "black" and "black" to "white" transitions. It will be readily understood that the video squaring circuit 49 may not be required if the usual video amplifier circuits (not shown) and the camera tube 11 possess adequate bandwidth.

In accordance with the system and method of the invention, each "black" video signal appearing in an initial one-line video signal is assumed to be three picture elements long, however, at the receiving station, only two black element are displayed, as will be hereinafter described. Thus, if an entire line of the optical image should be all "black," the display would be in the form of a dashed line consisting of two black elements followed by one white element.

Thus, output circuit 50 of the video squaring circuit 49 is coupled to a conventional NOR circuit 52 which in turn is coupled to actuate a conventional monostable multivibrator 53 which generates in its output circuit 55 a pulse 54 having a duration equal to three picture elements. Out put circuit 55 of the three-element monostable multivibrator 53 is coupled back to the NOR circuit 52. Thus, the occurrence of a "black" video signal in the initial one-line squared video signal will result in the generation of a three element "black" video signal pulse 4. If a "black" video signal is still present, or another one has occurred upon termination of the three-element pulse 54, the monostable multivibrators 53 will immediately be actuated again to generate another three-element pulse 54.

Output circuit 55 of the three-element monostable multivibrator 53 is coupled to a narrow pulse generator 56 which generates a narrow pulse 57 in its output circuit 58 in response to each three-element pulse 54 generated by the monostable multivibrator 53. Output circuit 58 of the narrow pulse generator 56 is coupled to a conventional NOR circuit 59.

Monostable multivibrator 39 which is actuated in response to the trailing edge pulse 37 provided by differentiating circuit 36 *generates* a read-in enable pulse 60 in its output circuit 62. Output circuit 62 is coupled to a conventional inverter 63 which inverts the read-in enable pulse 60, as at 60*a* and applies it to the NOR circuit 59. Output circuit 42 of the header monostable multivibrator 38 is also coupled to the NOR circuit 59. It will thus be seen that the header pulses 40 are applied to the NOR circuit 59 along with a modified one-line video signal consisting of the narrow pulses 57. Thus, in the presence of a read-in enable pulse 68, the NOR circuit 59 will pass both the header pulses 40 and the modified one-line video signal pulses, in inverted form, to its output circuit 64, thus inserting the header pulses 40 at the start of each modified one-line video signal.

Output circuit 64 of NOR circuit 59 is coupled to another NOR circuit 65. Output circuit 62 of the read-in enable monostable multivibrator 39 is coupled to NOR circuit 66 which has its output circuit 67 coupled to the NOR circuit 65. Output circuit 68 of the NOR circuit 65 is coupled to a conventional delay line 69 which has a delay at least as long as the duration of a one-line video signal. Preferably, delay line 69 provides a delay:

$$D=\frac{2}{f}B$$

where $f$ is the bandwidth of the transmission facility and B is the number of binary bits of position information in the digital code to be hereinafter described.

It will thus be seen that the modified one-line video signal consisting of the narrow pulses 57, with a header pulse 40 at the start thereof, is inserted in and circulated through the delay line 69, appearing as a corresponding delayed one-line video signal in output circuit 70. The delayed one-line modified video signal is recirculated through the delay line 69 by a recirculating circuit 71 now to be described. Output circuit 70 of the delay line 69 is coupled to a conventional inverter 72 which thus inverts the header pulse and modified one-line delayed video signal. Output circuit 73 of the inverter 72 is coupled to a NOR circuit 74 which has its output circuit 75 coupled to the NOR circuit 66. Thus, in the absence of a read-in enable pulse 60, the delayed header pulse 40 and the following delayed one-line, modified video signal appearing in output circuit 70 of delay line 69 is inverted by the inverter 72 and passes through the NOR circuits 74, 66 and 65 to the input end 68 of delay line 69, thus being recirculated therethrough thereby to provide a succession of progressively delayed header pulses and modified, one line video signals. The delayed header pulse at the start of each delayed modified one-line, video signal circulated through the delay line 69 and appearing in its output circuit 70 is detected by a header detector circuit 76, which may be a conventional pulse width detector and an inverted pulse 77 is provided in its output circuit 78 in response thereto. Output circuit 78 of the header detector 76 is coupled to a conventional differentiating circuit 79 which differentiates the trailing edge of the inverted detected header pulse 77 to provide differentiated pulse 80 which actuates a monostable multivibrator 82 to generate pulse 83 in its output circuit 84. Output circuit 84 of the monostable multivibrator 82 is coupled to the "SET" circuit of a conventional bistable multivibrator 85. Thus, the trailing edge of each detected header pulse 77 actuates the bistable multivibrator or flip-flop circuit 85 to initiate a pulse 86 in its output circuit 87. Output circuit 87 of the flip-flop circuit 85 is coupled to a conventional NOR circuit 88 along with output circuit 89 of a conventional clock pulse generator 90 which generates clock pulses having a frequency $f_e$ corresponding to the frequency of the video signal elements in one line. Output circuit 92 of the NOR circuit 88 is coupled to a conventional pulse counting circuit 93 which provides a pulse count in a plurality of output circuits 94 in parallel digital form. Thus, each delayed header pulse 40 at the start of each delayed one-line video signal which is circulated through the delay line 69 initiates a pulse counting operation by the counter 93. Output circuit 84 of the monostable multivibrator 82 is also coupled to the "reset" circuit of counter 93 to reset the same.

Output circuit 70 of the delay line 69 is also coupled to a video pulse detector 95, which may be another pulse width discriminator, which detects the occurrence of the first "black" narrow pulse 57 in each delayed modified one-line video signal circulated through the delay line 69 and provides an inverted pulse 96 in its output circuit 97 in response thereto. Output circuit 97 is coupled to a conventional NOR circuit 98 which has its output circuit 99 coupled to the "reset" circuit of the flip-flop circuit 85 thereby to terminate the pulse 86 provided thereby. It will thus be seen that for each delayed, modified, one-line video signal appearing in the output circuit of 70 of delay line 69, the respective delayed header pulse will reset the counter 93 to zero, and actuate the flip-flop circuit 85 to initiate pulse 86 which, in turn, initiates counting by the counter 93, of the clock pulses 100 provided by the clock generator 90, and that occurrence of the first "black" signal pulse in the delayed, modified, one-line video signal will actuate the flip-flop circuit 85 to terminate the pulse 86 and thus terminate the pulse counting operation of counter 93, the pulse count provided thereby appearing in digital form in its output circuits 94 indicating the location of the first "black" video signal pulse in the respective delayed, modified, one-line video signal in terms of the number of picture elements, by which the first "black" signal is displaced from the start of the line.

Output circuit 87 of the flip-flop circuit 85 is also coupled to a conventional differentiating circuit 102 which differentiates the pulse 86 and actuates monostable multivibrator 103 in response to the trailing edge of pulse 86 thereby to generate an erase pulse 104 in its output circuit 105. Output circuit 105 of the monostable multivibrator 103 is coupled to the NOR circuit 74 in the recirculating circuit 71 of delay line 69. The erase pulse 104 has a duration slightly longer than a narrow signal pulse 57 and thus, application of the positive-going erase pulse 104 to the NOR circuit 74 will prevent passage of the first delayed, "black," signal pulse therethrough, thus effectively erasing a first "black" signal pulse from the delayed, modified one-line video signal which is recirculated through the delay line 69, so that the second "black" video signal, if any, now becomes the first "black" video signal pulse in the next successive delayed, modified, one-line video signal appearing in output circuit 70.

The parallel digital signal output circuits 94 of the counter 93 are coupled by conventional "AND" gates, shown collectively at 106 to a conventional parallel-to-series shift register 107. Output circuit 78 of the header detector 76 is coupled to the AND gates 106 and it will thus be seen that each detected header 77 which initiates a new pulse-counting operation by the counter 93 will also shift-out the previous pulse count to the shift register 107. A shift pulse generator 108 having a frequency $f_c$ is coupled to the shift register 107 to shift-out a parallel digital pulse count in serial form in output circuit 109. The output circuit 109 of the shift register 107 is coupled to transmission facility 110 by a conventional OR circuit 112.

It will be readily seen that the frequency of the clock pulse generator 90 is:

$$fe=f_hE$$

where $f_h$ is the horizontal sweep frequency provided by the line sweep generator 15 and E is the total number of picture elements in one line, and that the shift frequency, i.e., the frequency of the shift pulse generator 108 is:

$$f_c=\frac{f_e}{B}$$

It will now be seen that the remaining first "black" video signal pulse in each successive delayed, modified, one-line video signal appearing in output circuit 70 of delay line 69 results in the provision of a location pulse count responsive to the location of the respective first "black" signal with respect to the respective header pulse, which location pulse count is digitally encoded and transmitted over the transmission facility 110. It will also be seen that in due course, a delayed, modified, one-line video signal will appear in output circuit 70 of delay line 69 which contains no "black" video signal pulse, all such pulses having previously been erased as above-described. The delayed detected header pulse 77 of this last one line signal will "set" the flip-flop circuit 85 to initiate a pulse 86, however there will be no detected first "black" signal pulse 96 to reset the flip-flop circuit 85. Output circuit 87 of the flip-flop circuit 85 is also coupled to NOR circuit 113 along with output circuit 78 of the header detector 76. Thus, the pulse 86 provided by the flip-flop circuit 85 in response to the last all "white" delayed, modified, video signal will be applied to the NOR circuit 113 along with the detected header pulse 77 of the first recirculation of that all "white" line, resulting in provision of a line-advance pulse 114 in output circuit 115 of the NOR circuit 113. Output circuit 115 of the NOR circuit 113 is coupled to a conventional differentiating circuit 116 which differentiates the line advanced pulse 114 and provides a differentiated pulse 117 in response to its trailing edge, which actuates monostable multivibrator 118 to generate a resetting pulse 119 in its output circuit 120. Output circuit 120 of the monostable multivibrator 118 is coupled to the NOR circuit 98 thereby applying a resetting signal to the flip-flop circuit 85 in response to the line-advance pulse 114 so as to terminate the pulse 86.

Output circuit 115 of the NOR gate 113 is also coupled to the NOR circuit 35 for applying the line-advance pulse 114 thereto. The inverted line-advance pulse appearing in the output circuit of the NOR circuit 35 is again differentiated by circuit 36 and the trailing edge thereof again actuates the monostable multivibrator 38 to generate a new header pulse 40, and actuates monostable multivibrator 39 to generate a new read-in enable pulse 60. The new header 40, inverted by the inverting circuit 43, and differentiated by the differentiating circuit 44, actuates the line sweep monostable multivibrator 46 to initiate a new line synchronizing pulse 47 which, in turn, actuates the line sweep generator 15 to initiate a new line sweep and the frame sweep generator 18 to advance the line sweep by one increment, thereby to scan the next line of the optical image and to generate a new, initial one-line video signal.

The output circuit 48 of the line sweep monostable multivibrator 46 is coupled to a line sync. monostable multivibrator 122 which has its output circuit 123 coupled to the OR circuit 112, output circuit 29 of the frame sync. monostable multivibrator 25 also being coupled to the OR circuit 112.

OPERATION OF THE TRANSMITTING STATION

Figures 1, 2:
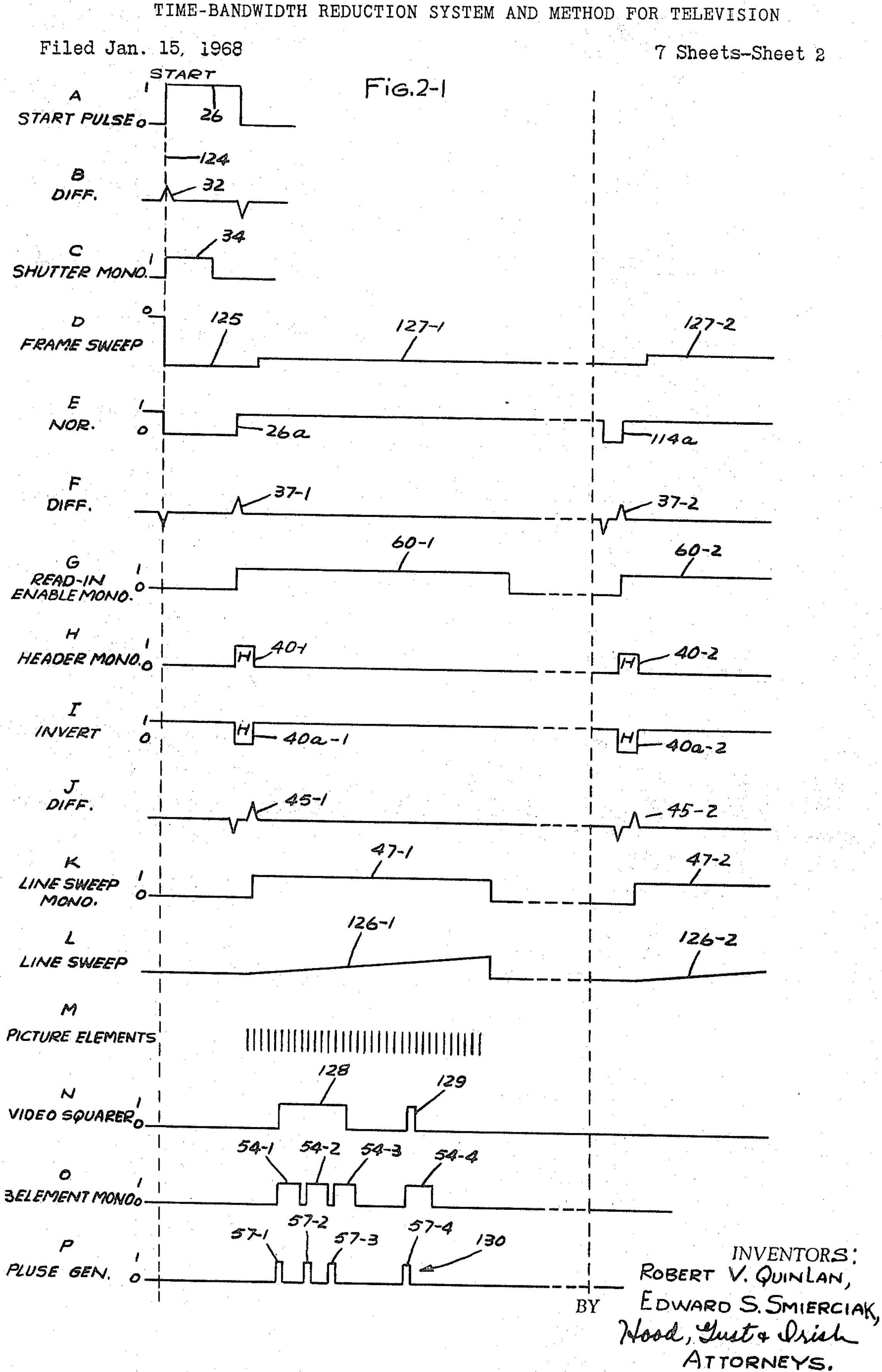
Figure 2:
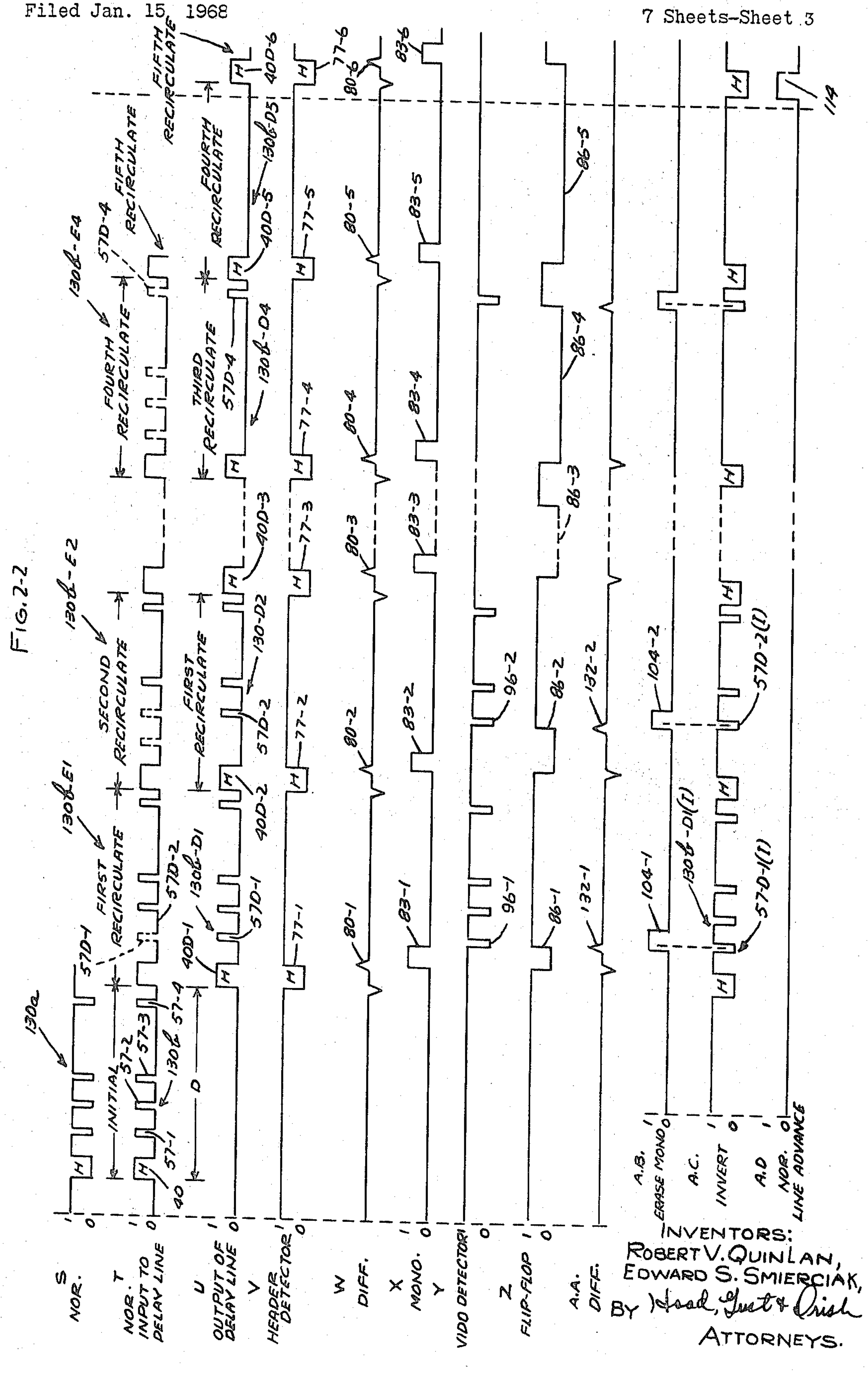
FIGS. 2A through P are timing diagrams useful in explaining the mode of operation of the transmitting station of the invention.

Referring now to FIG. 2 in addition to FIG. 1, actuation of "START" switch 27 at the point indicated by the dashed line 124 actuates the frame sync. monostable multivibrator 25 to generate the frame sync. pulse 26 as shown in FIG. 2A, which is differentiated by differentiator circuit 30 to provide differentiated pulse 32, as shown in FIG. 2B, which in turn actuates the shutter monostable multivibrator 33 to generate the shutter pulse 34, as shown in FIG. 2C. The differentiated leading edge pulse 32 is also applied to the "reset" input circuit of the frame sweep generator 18 to reset the vertical deflection voltage applied to the vertical deflection coil 13 of the camera tube 11 to its initial level 125, as shown in FIG. 2D. Frame sync. pulse 26 is also applied to the NOR circuit 35 and inverted thereby, as at *26a* in FIG. 2E. The inverted frame sync. pulse *26a* is differentiated by the differentiating circuit 36 to provide a trailing edge differentiated signal 37, as shown in FIG. 2F, which actuates the monostable multivibrator 39 to generate the read-in enable pulse 60, as shown in FIG. 2G, and actuates the monostable multivibrator 38 to generate the header pulse 40, as shown in FIG. 2H.

The header pulse 40 is inverted by the inverting circuit 43 to provide inverted pulse *40a*, as shown in FIG. 2I, that pulse being differentiated by the differentiator 44 to provide the trailing edge differentiated pulse 45, as shown in FIG. 2K, which actuates the line sweep monostable multivibrator 46 to provide the line sync. pulse 47, as shown in FIGS. 2K and L. Application of the line sync. pulse 47 to the line sweep generator 15 actuates the same to provide the line sweep signal 126, as shown in FIG. 2M, and application of the line sync. pulse 47 to the frame sweep generator 18 actuates the same to provide the first increment or step of vertical deflection voltage, as shown at 127 in FIG. 2D.

Referring now to FIG. 2N, there is shown diagrammatically the picture elements contained in one line, it being understood that actually many more picture elements will normally be provided, such as for example 400.

Referring now to FIG. 2O, it will be assumed that the initial one-line, squared, video signal appearing in the output circuit 50 of the video swing circuit 49 consists of a first "black" signal 128 of appreciable duration followed by a second "black" signal 129 of relatively short duration. The three-element monostable multivibrator 50B will thus generate three-element pulses 54–1, 54–2 and 54–3 in response to the "black" signal 128, and three-element pulse 54–4 in response to the "black" signal 129, as shown in FIG. 2Q. Application of the three-element pulses 54, to the narrow pulse generator 56 results in a provision of a modified one-line video signal 130, as shown in FIG. 2R, formed of corresponding narrow pulses 57–1, 57–2, 57–3 and 57–4.

The header pulse 40 is inserted ahead of the modified one-line video signal 130 by NOR circuit 59 to provide the inverted, modified, one-line video signal **130*a* to output circuit 64 of NOR 59, and the reinverted, initial, modified, one-line video signal 130*b* in output circuit 68 of NOR circuit 65, as shown in FIGS. 2S and T, the modified, one-line video signal 130*b* being formed of a header pulse 40 and narrow signal pulses 57–1, 57–2, 57–3 and 57–4**.

The modified, one-line video signal **130*b* is inserted at the input end 68 of the delay line 69, delayed by the time D, and thus appears in the output circuit 70 of delay line 69 as shown at 130*b*–D1 in FIG. 2U. The header detector 76 detects the delayed header pulse 40 D–1 to provide the detected header 77–1 as shown in FIGS. 2U and 2V, which is differentiated by differentiating circuit 79 to provide the differentiated trailing edge pulse 80–1 which, in turn actuates monostable multivibrator 82 to generate the setting pulse 83–1, as shown in FIGS. 2W and X. The setting pulse 83–1 is applied to the "set" circuit of the flip-flop circuit 85 to initiate pulse 86–1**, as shown in FIG. 2Z.

Meanwhile, the video pulse detector 95 detects the first delayed "black" video signal pulse 57D–1 appearing in the delayed one-line video signal **130*b*–D1, as shown at 96–1 in FIG. 2Y, the detected video pulse 96–1 resetting the flip-flop circuit 85 terminating the pulse 86–1, as shown in FIG. 2Z. Application of the "set" pulse 83–1 to the "reset" circuit of counter 93 resets the same to "zero" and application of the pulse 86–1 to the NOR circuit 88 results in passing the clock pulses 100 having a frequency $f_e$ to the counter 93 during the duration of the pulse 86–1, as shown in FIG. 2AE, the digital pulse count of the clock pulses 100 provided by the counter 93 thus indicating the location of the first detected "black" delayed signal 57D–1 in the first delayed, one-line video signal 130*b*–D1 with respect to the first header pulse 40D–1. It will be readily understood that the parallel digital pulse count provided by the counter 93 is loaded into the AND gates 106**.

Meanwhile, the location pulse 86–1 provided by the flip-flop circuit 85 is differentiated by the differentiating circuit 105 to provide the differentiated trailing edge pulse 132–1, as shown in FIG. 2 which actuates the monostable multivibrator 103 to generate erase pulse 104–1, which is applied to the NOR circuit 74 along with the inverted delayed, modified one-line video signal **130*b*–D1 (I) from the inverter 72, as shown in FIG. 2N. Comparison of FIGS. 2AB and AC will indicate that coincidence of the erase pulse 104–1 and the inverted first "black" signal pulse 57D–1 (I) will result in erasure of that pulse from the signal being recirculated and applied to the input end 68 of the delay line 69, as shown at 130*b*–E1 in FIG. 2T. It will now be seen that in the delayed, modified, one-line video signal which is recirculated for the first time through the delay line 69, the former first video signal pulse 57D–1 has been erased and that the former second delayed video signal pulse 57D–2 has now become the first video signal pulse in the signal 130*b*–E1 inserted in the input end 68 of the delay line 69 and in the delayed, modified, one-line video line signal appearing in the output end of the delay line, as shown at 130*b*–D2** in FIG. 2U.

The transmit shift pulses 133 are shown in FIG. 2AF, these pulses being applied to the shift register 107. Recalling now that the pulse count 100–1 provided by the counter 93 in response to the location pulse 86–1 has been loaded into the AND gates 106, application of the next detected header 77–2 responsive to the header 40D–2 in the first recirculated, delayed, modified one-line video signal **130*b*–D2, to the AND gates 106 will result in shifting out of the parallel digitally encoded pulse count 100–1 to the output circuit 109 and transmission facility 110 in serially digitally encoded form, as shown at 134–1** in FIG. 2AG.

It will now be seen that the digitally encoded transmission signal 134–1 corresponds, in digitally encoded form, to the pulse count provided by counter 93 which, in turn, indicates the location of the first delayed "black" video signal 57D–1 in the first delayed, modified, one-line video signal **130*b*–D1 with respect to the respective header pulse 40D–1. Thus, stated simply, the location of the first "black" video signal pulse circulated through the delay line 69**, in terms of video elements from the start of the respective delayed one-line video signal, is detected and a digitally encoded transmission signal indicative of that location is generated and transmitted.

The process is now successively repeated on each delayed, modified, one-line video signal recirculated through the delay line 69 and appearing in its output circuit 70. Thus, as to the first such delayed, modified, one-line video signal **130*b*–D2 recirculated through delay line 69, and in which the "black" video signal 57D–2 is now the first occurrence of a "black" signal pulse, the header 40D–2 is detected, as at 77–2, differentiated as at 80–2, and initiates the location pulse 86–2. Likewise, the "black" video signal 57D–2 is detected, as at 96–2, and terminates the location pulse 86–2, location pulse 86–2 enabling the counter 93 to provide the digital pulse count 100–2 indicative of the location of the "black" signal pulse 57D–2 with respect to the header 40D–2. Location pulse 86–2 is differentiated, as at 132–2, causing generation of the erase pulse 104–2 which disables the NOR circuit 74 so that the inverted "black" signal pulse 57D–2(I) does not pass therethrough, thus erasing the "black" signal pulse 57D–2 from the delayed, modified, one-line video signal 130*b*–E2 applied to the input end 68 of delay line 69 for the second recirculation therethrough. Once again, application of the next detected header 77–3 to the AND gates 106 shifts the digital pulse count 100–2 out to the shift register 107, the shift pulses 133 thus shifting-out the pulse count in serial digitally encoded form, as at 134–2**.

Thus, the location of each delayed "black" signal pulse 57D, in terms of the number of picture elements it is displaced from the respective delayed header 40D, is converted to a digitally encoded signal 134 which is transmitted over the transmission facility 110. It will now be seen that the fourth and last delayed "black" signal pulse 57D–4 which appeared in the third recirculated, delayed modified, one-line video signal 130B–D, and which resulted in digital pulse count 100–4 and generation of the digitally encoded transmission signal 134–4, is erased from the fourth signal **130*b*–E4 inserted in the delay line 69 and thus, that the fourth recirculated delayed signal 130*b*–D5 appearing in the output circuit 70 of the delay line 69 is all "white" following the delayed header 40D–5. The detected header 77–5 thus initiates location pulse 86–5 however, it will be seen that there is no delayed "black" signal pulse 57 in the fourth recirculated delayed, modified, one-line video signal 130*b*–D5 to be detected and to terminate the location pulse 86–5. However, the negative-going location pulse 86–5 is applied to the line advance NOR circuit 113. The fourth recirculated, delayed, modified one-line video signal 130*b*–D5, consisting only of the delayed header 40D–5, is then recirculated through the delay line 69 and its delayed header 40D–6 appearing in output circuit 70 of delay line 69, as detected at 77–6, is also applied to the NOR circuit 113. Detected header 77–6** being negative-going, along with the negative-going location pulse 86–5, results in the production of the line advance signal 114 in output circuit 115 of the NOR circuit 113 which is time coincidence with the detected header 77–6.

The line advance pulse 114 is differentiated by differentiater 116 to provide a trailing edge differentiated pulse 117, which is applied to monostable multivibrator 118 to generate negative-going pulse 119 which is applied to the NOR circuit 98 to provide a positive-going pulse which is applied to the "reset" circuit of the flip-flop circuit 85 to terminate the location pulse 86–5.

Meanwhile, the line-advance pulse 114 is applied to NOR circuit 35, inverted to provide pulse 114*a* (as in FIG. 2E) which is differentiated by a differentiating circuit 36 to provide a trailing edge differentiated pulse 37–2, which actuates monostable multivibrators 38 and 39 to generate a new header 40–2 and a new read-in enable pulse 60–2, as shown in FIGS. 2E and H. Header 40–2 is inverted by inverter 43 to provide inverted pulse 40*a*–2, which in turn is differentiated by differentiating circuit 44 to provide trailing edge differentiated pulse 45–2, which actuates the line sweep monostable multivibrator 46 to initiate a new line sync. signal 47–2. This new line sync. signal 47–2 is applied to the line and frame sweep generators 15 and 18 to initiate a new line sweep 126–2 and to advance the line sweep by one increment or step, as at 127–2, thereby to scan a new line of the optical image.

Reference to FIG. 2AG will indicate that the line sync. monostable multivibrator 122 generates a transmitted line sync. pulse 135 which terminates coincident with the start of the first digitally encoded location signal 134–1.

It will now be seen that the first, second, third and fourth "black" video signal pulses 57–1, 57–2, 57–3, and 57–4 are respectively located, for example, 50, 100, 150 and 300 video picture elements from the header 40, which is inserted at the start of the line, the respective locations in terms of digitally counted clock pulses 100–1, 100–2. 100–3, and 100–4 are respectively digitally encoded to provide the bilevel transmission signals 134–1, 134–2, 134–3, and 134–4. It will further be seen that this one line-at-a-time scanning with one modified "black" element at a time digital conversion and transmission is continuous until the entire optical image has been so scanned, converted and transmitted.

While in the illustrated embodiment, the modified, one-line video signals with the header pulses 40 inserted at the start thereof are coupled to the delay line 69 between the erase NOR circuit 74 and the input end 68 of the line so that the initial modified, one-line video signal is passed through the delay line, it will be readily apparent that the initial modified, one-line video signal may be coupled to the recirculating circuit 71 between the output end 70 of the delay line and the erase NOR circuit 74 so that the initial modified, one-line video signal does not pass through the delay line 69. It will further be seen that the line advance pulse 114 may be taken directly from the counter 93 i.e., when the counter 93 has reached a full count of 400 clock pulses, which correspond to the number of video picture elements in one line, thus to indicate that there are no "black" video signals remaining in the recirculated delayed, one-line video signal, delay pulse 114 would be provided as an output from the counter 93.

RECEIVING STATION

Figures 2, 3:
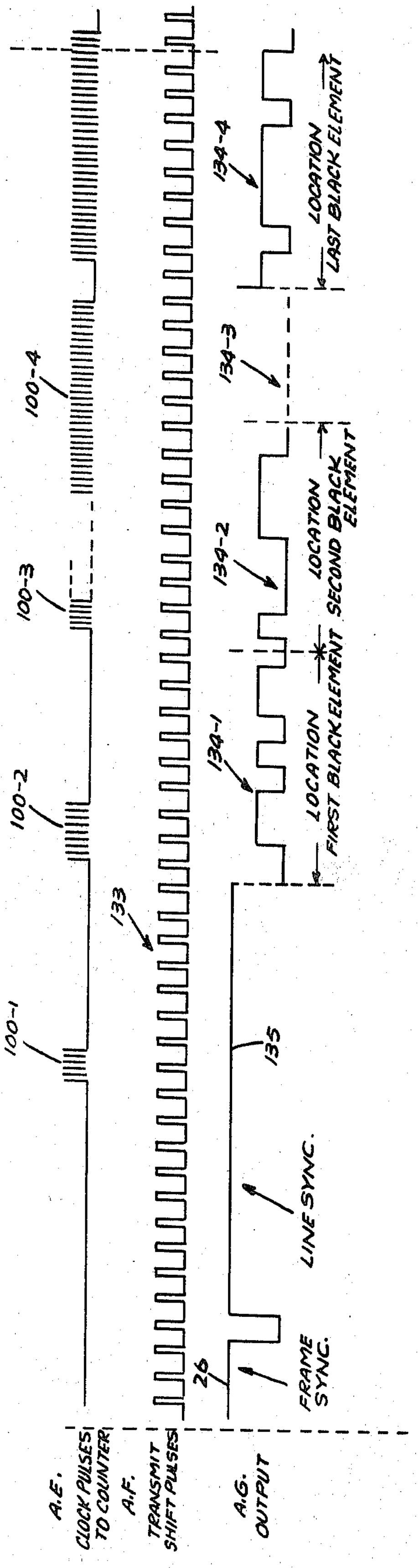
FIG. 3 is a schematic diagram showing the receiving station of the invention.
Figure 3:
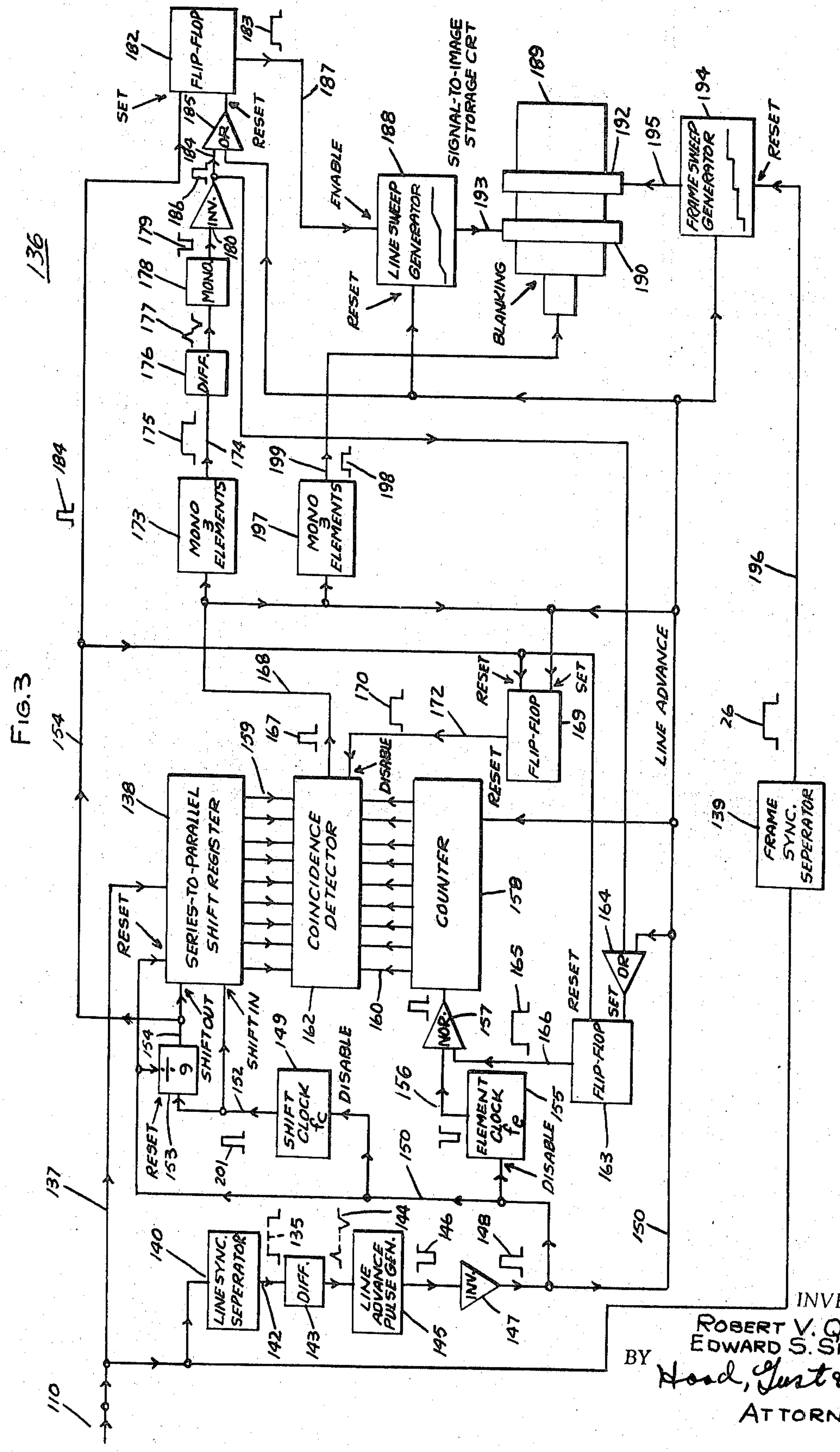

Referring now to FIG. 3, there is shown a receiving station, generally indicated 136, which may be used for decoding the digitally encoded transmission signals provided by the transmitting station 10 in FIG. 1, and for reconstructing and displaying an image corresponding to the optical image which is scanned one line at a time by the camera 11. The transmission facility 110, which may be a telephone line or radio link, is coupled to the input circuit 137 which, in turn, is coupled to the input of series to parallel shift register 138. Input circuit 137 is also coupled to a conventional frame synchronizing pulse separator circuit 139, which may be a conventional pulse width discriminator, for separating the transmitted frame synchronizing pulses 26. Input circuit 127 is further coupled to a conventional line synchronizing pulse separator 140, which scan may be a conventional pulse with discriminator, for separating the transmitted line sync. signals 135. Output circuit 142 on the line sync. separator 140 is coupled to a conventional differentiating circuit 143 which provides a trailing edge differentiated pulse 144 which, in turn, actuates monostable multivibrator 145 to generate a negative-going pulse 146. Pulse 146 is inverted by inverter 147 to provide a line-advance pulse 148.

A shift pulse clock generator 149 is provided which generates shift pulses 201 having the frequency $f_e$. Output circuit 150 of the inverter 147 is coupled to a "disable" circuit of the shift pulse clock generator 149 for disabling the same momentarily in response to each line advance pulse 148, thereby to synchronize the shift pulse clock generator. Output circuit 150 of the inverter 147 is also coupled to the "reset" input circuit of the shift register 138 thereby to reset the same in response to each line advance pulse 148.

Output circuit 152 of the shift pulse clock generator 149 is coupled to the "shift in" input circuit of the shift register 138 for applying the shift pulses thereto, thereby to shift the digitally encoded transmission signal 134 into the shift register 138.

In the illustrated embodiment, a nine-bit digital code is employed. Output circuit 152 of a shift pulse clock generator 149 is therefore also coupled to a conventional dividing circuit 153 which divides the shift pulses by nine thereby to provide a train of pulses for shifting the digitally encoded transmission signals 134 out of the shift register 138. Output circuit 154 of the dividing circuit 153 is coupled to the "shift out" circuit of the shift register 138. The output circuit 150 of the inverter 147 is likewise coupled to the "reset" input circuit of dividing circuit 153 for resetting the same in response to each line advance pulse 148.

An element clock pulse generator 155 is provided which generates clock pulses having a frequency $f_e$. Output circuit 150 of inverter 147 is coupled to the "disable" input circuit of the element clock pulse generator 155 for disabling the same in response to each line advance pulse 148 thereby to synchronize the clock pulse generator 155. Output circuit 156 of the element clock pulse generator 155 is coupled to NOR circuit 157 which, in turn, is coupled to digital pulse counter 158.

It will now be seen that the digitally encoded transmission signals 134 are shifted into the shift register 138 by the shift pulses generated by the shift pulse clock generator 149, the shift register thus providing a parallel digital pulse count in response to each digitally encoded transmission signal 134 which corresponds to the respective parallel pulse count provided by the counter 93 at the transmission station. The parallel digital output circuits 159 of the shift register 138 and the parallel digital output circuits 160 of the counter 158 are respectively connected to a coincidence detector 162.

Output circuit 150 of inverter 147 is also coupled "set" circuit of flip-flop circuit 163 through OR circuit 164. Thus, each line advance pulse 148 sets the flip-flop circuit 163 to initiate a disabling pulse 165 in output circuit 166. Output circuit 166 of the flip-flop circuit 163 is coupled to the NOR circuit 157 along with the output circuit 156 of the element clock 155. Output circuit 154 of the dividing circuit 153 is also coupled to the "reset" input circuit of the flip-flop circuit 163 thereby to terminate the disabling pulse 165 in response to each "shift out" pulse. Application of a positive-going disabling pulse 165 to the NOR circuit 157 inhibits passing of the element clock pulses 166 to the counter 158. Thus, when a "shift out" pulse is applied to the shift register 138 to shift out the digital pulse count to the coincidence detector 162, that pulse resets the flip-flop circuit 163 to terminate the disabling pulse 165 thereby permitting the element clock pulses 166 to be passed by the NOR circuit 157 to the counter 158 which, in response thereto, provides a digital pulse count in output circuits 160. When coincidence has been detected between the digital pulse count appearing in the output circuits 159 of the shift register 138 and the digital pulse count in the output circuits 160 of the counter 158, a location pulse 167 is provided in output circuit 168 of the coincidence detector 162.

Output circuit 150 of inverter 147 is also coupled to the "set" circuit of flip-flop circuit 169 thereby to initiate disabling pulse 170 in its output circuit 172. Output circuit 172 of flip-flop circuit 169 is coupled to a "disable" output circuit of coincidence detector 162 thereby to disable the same in response to the disabling pulse 170. Output circuit 154 of the dividing circuit 153 is also coupled to the "reset" circuit of the flip-flop circuit 169 thereby to terminate the disabling pulse 170, thus to prevent the coincidence detector 162 from seeking a coincidence while the digitally encoded transmission signals 134 are being shifted into the shift register 138.

Output circuit 168 of coincidence detector 162 is coupled to a three-element monostable multivibrator 173 which generates in its output circuit 174 a pulse 175 having a duration equal to three picture elements in response to each location pulse 167. Output circuit 174 of the monostable multivibrator 173 is coupled to conventional differentiating circuit 176 which provides a differentiated pulse 177 in response to the trailing edge of each three-element pulse 175. A differentiated trailing edge pulse 177 actuates a monostable multivibrator 178 to generate pulse 179 which is inverted by inverter 180, as at 186.

Output circuit 154 of the dividing circuit 153 is also coupled to the "set" input circuit of flip-flop circuit 182 thereby to initiate a line sweep enable pulse 183 in response to each "shift out" pulse 184. Output circuit 184 of inverter circuit 180 is coupled through NOR circuit 185 to the "reset" circuit of the flip-flop circuit 182 thereby to terminate the line sweep enable pulse 183 in response to each pulse 186. Thus, it will be seen that the enable pulse 183 is generated in response to each "shift out" pulse 184 and terminated thereafter in response to each pulse 186 which occurs three elements after occurrence of the respective location pulse 167. Thus, each line sweep enable pulse 183 has a duration equal to the duration of the respective location pulse count provided by the shift register 138 plus three picture elements.

Output circuit 187 of the flip-flop circuit 182 is coupled to the "enable" input circuit of line sweep generator 188. Thus, line sweep generator 188 is enabled to generate a line sweep deflection voltage during the occurrence of each line sweep enable pulse 183, the sweep voltage generation being interrupted upon the termination of each pulse 183 and resumed upon the occurrence of the next pulse 183. Output circuit 150 of the inverter 147 is also coupled to the "reset" input circuit of the line sweep generator 188 thereby to reset the same to its initial deflection voltage in response to each line-advance pulse 148.

A conventional signal-to-image storage cathode ray tube 189 is provided having horizontal and vertical deflection coils 190, 192. Output circuit 193 of the line sweep generator 188 is coupled to the horizontal deflection coil 190 while conventional stair-step frame sweep generator 194 is provided having its output circuit 195 coupled to the vertical deflection coil 192. Output circuit 196 of the frame sync. circuit 139 is coupled to the "reset" input circuit of the frame sweep generator 194 thereby to reset the same to its initial vertical deflection voltage in response to each frame synchronizing pulse 26. Output circuit 150 of the inverter 147 is also coupled to a triggering circuit of the frame sweep generator 194 thereby to advance the line sweep by one increment or step in response to each line advance signal 148.

The signal-to-image storage display tube 189 is operated to write "white" and to be blanked "black" as is well known to those skilled in the art. Output circuit 168 of the coincidence detector 162 is also coupled to a two-element monostable multivibrator 197 which generates a blanking pulse 198 in its output circuit 199 two picture elements in duration in response to each location pulse 167. Output circuit 199 of the monostable-multivibartor 197 is coupled to the blanking signal input circuit of the display tube 189. It will now be seen that the writing beam of the signal-to-image storage display tube 189 is caused to scan in one line to a location corresponding to the location pulse 167 with respect to the start of the line, the scan continuing for an additional three picture elements, the beam being blanked for two elements thus, as previously indicated, scanning of an all "black" line viewed by the camera tube 11 will result in display of a dashed line formed of "black" dashes two elements long respectively by "white" spaces one element long.

Output circuit 150 of inverter 147 is finally coupled to NOR circuit 185 thereby to reset the flip-flop circuit 182 in response to each line advance pulse 148. Output circuit 184 of the inverter 180 is also coupled to the OR circuit 164 thereby to "set" the flip-flop circuit 163 to initiate a new disabling pulse 165 in response to each pulse 186 which, as described above, is generated in response to the trailing edge of each three-element pulse 175.

OPERATION OF RECEIVING STATION

Figures 1, 4:
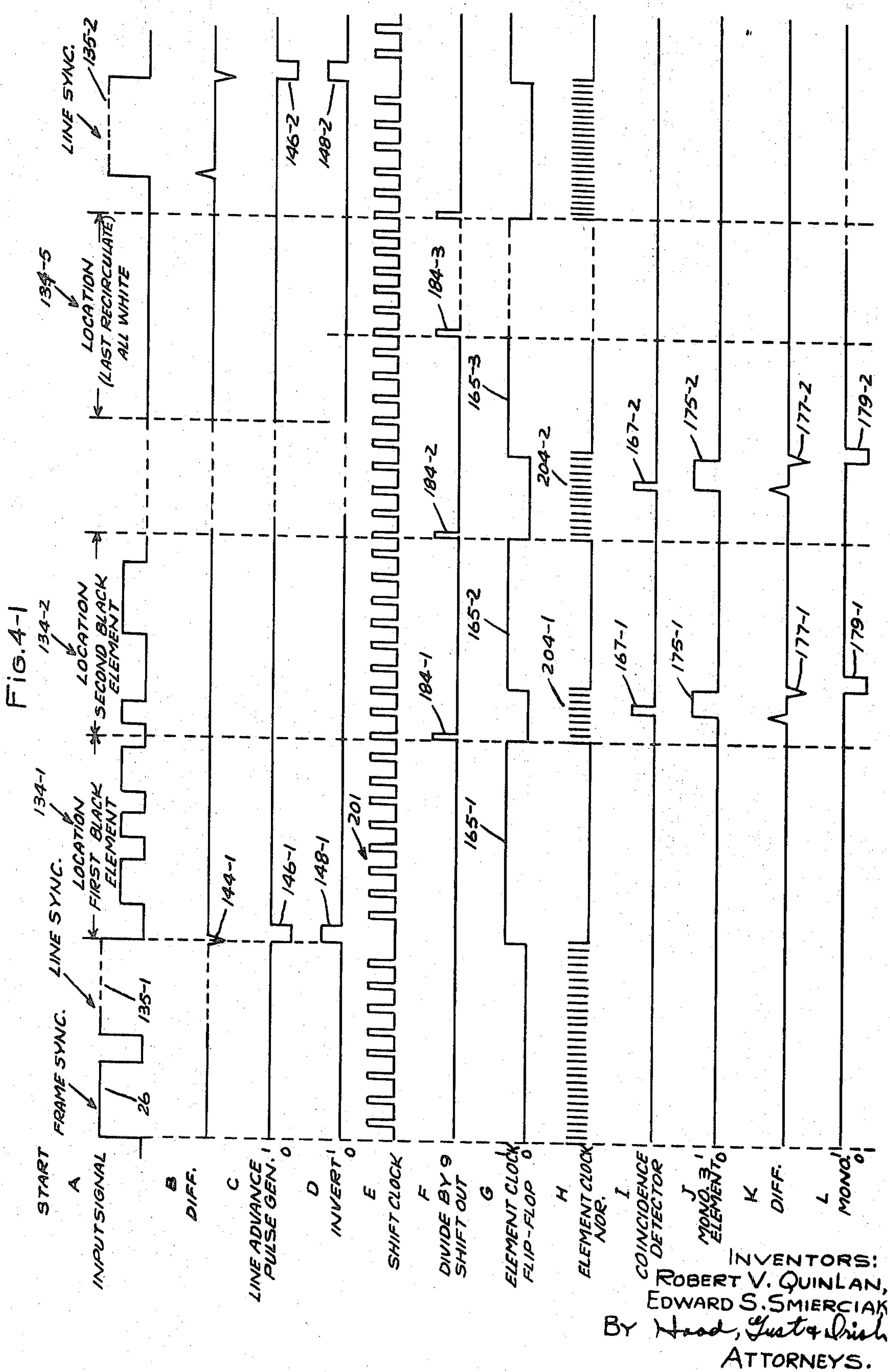
Figures 2, 4:
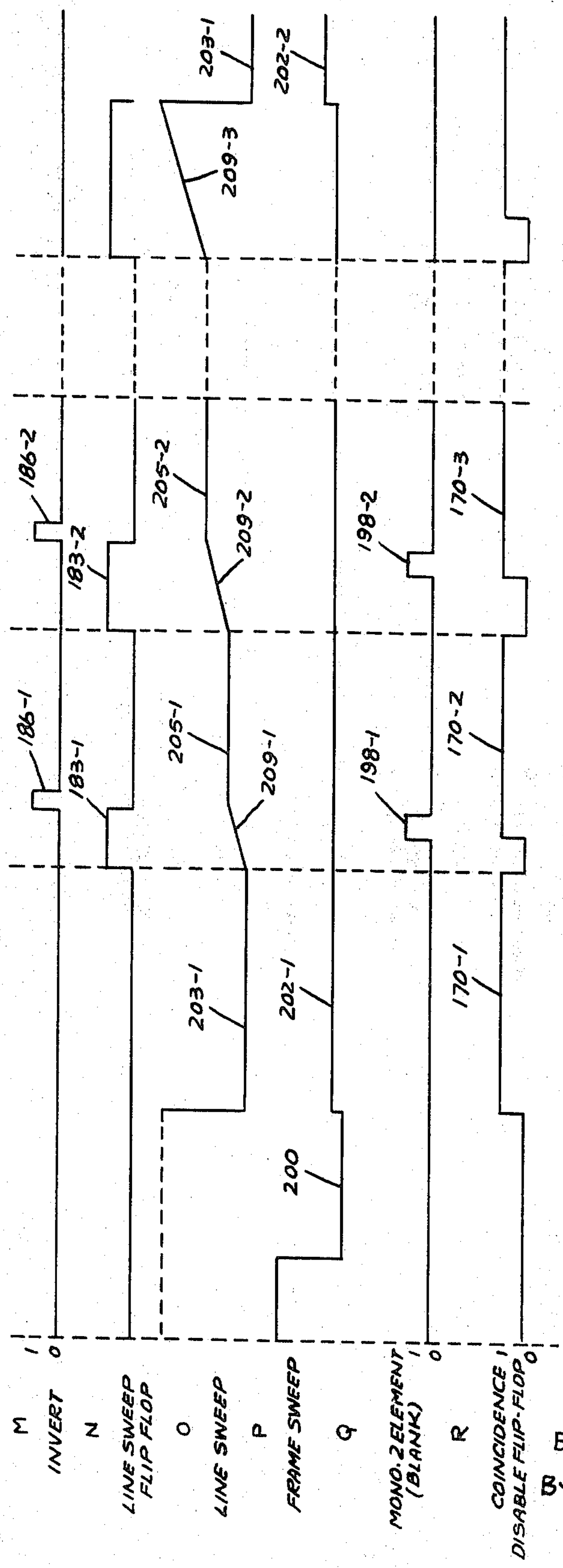
FIGS. 4A through R are timing diagrams useful in explaining the mode of operation of the receiving station of FIG. 3.

Referring now to FIG. 4A, there is shown the frame sync. pulse 26, the first line sync. pulse 135–1, the digitally encoded signals 134–1 thru 134–5, and the next successive line sync. pulse 135–2 received by the input circuit 137 from the tranmsission facility 110. The frame sync. pulse 126 is separated by the frame sync. separator circuit 139 and resets the frame sweep generator 194 to its initial deflection level 200, as shown in FIG. 4P. The line sync. pulse 135–1, which terminates coincident with the beginning of the first digitally encoded locational signal 134–1, is differentiated by the defferentiator 143 to provide the trailing edge pulse 144, which actuates the line advance pulse generator 145 to generate pulse 146 which, in turn, is inverted by the inverter 147 to provide line advance pulse 148, as shown in FIGS. 4, *B, C, D*. Line advance pulse 148 thus signifies the beginning of one line of digitally encoded location signals 134.

The first line-advance pulse 148–1 performs a number of functions; it disables the shift clock pulse generator 149 thereby to synchronize the same, as shown in FIG. 4E, and resets the shift register 138 so that it is prepared to shift in the first digitally encoded signal 134–1; it disables the element clock pulse generator 155 to synchronize the same, and sets the element clock flip-flop circuit 163 to initiate the disabling pulse 165–1, as shown in FIGS. 4G and H; it triggers the frame sweep generator 194 to advance the line sweep to the first step or increment 202–1, as shown in FIG. 4P; resets the line sweep generator 188 to its initial deflection voltage level 203–1, as shown in FIG 40, and; sets the coincidence detector disable flip-flop 169 to initiate the coincidence disable pulse 170–1, as shown in FIG. 4R.

The first received, digitally encoded, location signal 134–1 is then shifted into the shift register 138 by the shift clock pulses 201, it being observed that the element counter 158 is disabled by the first disable pulse 165–1 provided by the element clock flip-flop circuit 163, and that the coincidence detector 162 is disabled by the first coincidence disable pulse 170–1 provided by the coincidence detector disable flip-flop circuit 169, as shown in FIGS. 4G and F. The dividing circuit 153 counts-down the shift pulses 201 and thus provides shift-out pulse 184–1 in response to the ninth shift pulse as shown in FIG. 4F. The shift-out pulse 184–1 performs several functions; it resets the enabled clock flip-flop circuit 163 to terminate the disable pulse 165–1 thereby initiating application of a train 204–1 of element clock pulses to the counter 158 as shown in FIG. 4H; it shifts-out the digital pulse count provided by shift register 138 to fill the coincidence detector 162; it sets the line sweep flip-flop circuit 182 to initiate the line sweep enable pulse 183–1, as shown in FIG. 4N, and; it resets the coincidence detector disable flip-flop circuit 169 to terminate the coincidence disable pulse 170–1, as shown in FIG. 4R. The counter 158 thus counts-down the train 204–1 of element clock pulses and when coincidence is detected between the digital pulse count provided by counter 158 and the digital pulse count shifted out of shift register 138, location pulse 167–1 is generated, as shown in FIG. 4I. It will be readily seen that the location pulse 167–1 bears the same time relationship to the first shift-out pulse 184–1 as the first delayed, "black" signal pulse 57D–1 bore to the respective header pulse 40D–1, as shown in FIG. 2U, the location of the location pulse 167–1 thus corresponding to the location of the "first black" signal pulse in the modified, one-line video signal.

The location pulse 167–1 actuates the three element monostable multivibrator 173 to provied the pulse 175–1 having a duration equal to three picture elements, i.e. three element clock pulses generated by the element clock pulse generator 155, as shown in FIG. 4J. Location pulse 167–1 also actuates the two-element monostable multivibrator 197 to generate the blanking pulse 198–1 having a duration equal to two picture elements, i.e. two element clock pulses provided by the element clock pulse generator 155, as shown in FIG. 4Q.

Setting of the line sweep enable flip-flop 182 by the shift-out pulse 184–1 thereby initiating line sweep enable pulse 183–1 enables the line sweep generator 188 to initiate the line sweep deflection voltage as shown at 209–1 in FIGS. 4N and O. The three element pulse 175–1 is differentiated by the differentiating circuit 176 to provide the trailing edge differentiated pulse 177–1 which actuates monostable multivibrator 178 to generate pulse 179–1 which, in turn, is inverted by inverter 180 to provide pulse 186–1, as shown in FIGS. 4K, L, and M. Pulse 186–1 resets the line sweep enable flip-flop circuit 182 thereby to terminate the line sweep enable pulse 183–1 and to interrupt the line sweep deflection voltage, as at 205–1, as shown in FIGS. 4M, N, and O. Pulse 186–1 also resets the element clock flip-flop circuit 163 to initiate a new disable pulse 165–2, thereby terminating the counting operation of the counter 158 after it has counted-down a number of element clock pulses following the shift-out pulse 184–1 to coincidince pulse 167–1, plus the three pulses duration of the pulse 175–1. The location pulse 167–1 also resets the coincidence disable flip-flop circuit 169 to initiate a new coincidence disabled signal 170–2 so that the coincidence detector 162 no longer seeks to detect coincidence.

The line sweep deflection voltage 209–1 scans the writing beam of the display tube 189 to a location corresponding to the location of the location signal 167–1, plus three picture elements, as a result of the three-element pulse 175–1, the beam being blanked "OFF' so as to write "black" by the blanking pulse 198–1 for two elements starting with the location pulse 167–1. Thus, a two-element "black" signal is written into the storage electrode of the signal-to-image storage display tube 189 thus providing a two-element "black" element for display on the display screen corresponding to the three-element "black" signal 54–1 as shown in FIG. 2Q.

Meanwhile, the second digitally encoded location signal 134–2 is received and shifted into the shift register 138 by the shift pulses 201, the second shift-out pulse 184–2 responsive to the next nine shift pulses shifting-out the digital pulse count to the coincidence detector 162 and terminating the element clock disable pulse 165–2 thereby to enable the counter 158 again to commence counting the element clock pulses, as at 204–2; initiating a new line sweep enable pulse 183–2 thereby to enable the line sweep generator 188 to continue scanning of the writing beam as at 20–2; and terminating the coincidence detector disable pulse 170–2, thereby to permit the coincidence detector 162 to detect coincidence between the digital pulse count provided by the shift register 138 and the digital pulse count provided by the counter 158. When a new coincidence has been detected, a second location pulse 167–2 is generated having a location corresponding to the location of the second delayed signal pulse 57–2 with respect to the header 40 in the modified, one-line video signal, as shown in FIG. 2T. The location pulse 167–2 again causes generation of the three-element pulse 175–2 and the two-element pulse 198–2 which interrupts scanning of the writing beam in the display tube at the location of the location pulse 167–2, plus three elements, and blanks the beam to write a two-element long "black" signal.

In this fashion, the line sweep of the writing beam is continued step-by-step, until a two-element long "black" signal has been written on the storage electrode corresponding to the location of each location signal 167 provided by the coincidence detector 162, which in turn corresponds to the location of each "black' 'signal 57 in the modified one-line video signal processed at the transmitting station. Thus, again assuming that the "black" signal pulses 57–1, 57–2, 57–3, and 57–4 are respectively located at 50, 100, 150, and 300 picture elements from the respective header 40, as shown in FIG. 2T, the shift register 138 at the receiving station will first provide a digital pulse count of 50 in response to the first location signal 134–1, and when the counter 158 has counted-down 50 element clock pulses 201 and provided a digital pulse count in response thereto, the coincidence detector 162 will provide the first location pulse 167–1 which will cause the writing beam of the dispaly tube 189 to scan to a corresponding position, plus three-elements the beam being blanked for two-elements thereby to write "black", the position of the beam then being held stationary until a new coincidence has been detected. When the shift register 138 provides a second digital pulse count in response to the second digitally encoded location signal 134–2, the counter 158 resumes its count of the element clock pulses from fifty-three (the count of fifty which resulted in the initial coincidence and generation of the first location pulse 167–1, plus the three-element duration of the three-element pulse 175–1), to a digital pulse count of 100, at which point coincidence is again detected to provide the second location pulse 167–2 which causes the writing beam of the display tube 189 to resume scanning to a new location corresponding to that of location pulse 167–2, again plus three-elements with the beam again being blanked to write "black" for two elements.

In the illustrated modified one-line video signal, the end of the line is all white and, thus, the last digitally encoded location signal 134–5 will be coded for "white" and will be followed by a new line sync. pulse 135–2. The writing beam of the display tube 189 is thus caused to scan for the remainder of its scan across one-line as shown at 209–3 in FIG. 4O. The second line advance pulse 148–2 thus again resets the line sweep to its initial level 203–1, triggers the frame sweep generator 194 to advance the line sweep by one increment or step, as shown at 202–2 in FIG. 4T, thereby to scan a new line on the storage element of the display tube, and resets the shift register 138, preparing circuit 153 and the counter 158 for a new line of digitally encoded information as above described. The storage and display of the digitally encoded information thus continues, as above described, one line-at-a-time until complete frame or picture has been stored in the storage element of the display tube 189 and displayed.

It will be readily understood that rather than successively detecting coincidence between the digital pulse count provided by the shift register 138 in response to each digitally encoded location signal 134 and the digital pulse count provided by counter 158, a digital-to-analog converter may be employed for converting the digital pulse count provided by the shift register 138 to a corresponding analog sweep voltage.

While there have been described above the principles of this invention in connection with specific apparatus, it is to be clearly understood that this description is made only by way of example and not as a limitation to the scope of the invention.

What is claimed is:

1. A television transmission system comprising: camera tube means including line and frame scanning means and output circuit means for providing a time-based video signal; selectively actuable line sweep generator means coupled to said line scanning means for energizing the same to scan one line of an optical image thereby to generate an initial one-line video signal in response thereto; selectively actuable frame sweep generator means coupled to said frame scanning means for energizing the same to advance the line scanning one increment; video signal delay means having input and output ends with said input end coupled to said camera means output circuit means for delaying said initial one-line video signal by a predetermined time delay at least as long as the duration of said one-line; circuit means coupling said output and input ends of said delay means for recirculating the delayed one line video signal therethrough; first means for detecting the start of each one of said delayed one-line video signals circulated through said delay means; second means for detecting the first video signal having a predetermined level in each one of said delayed one-line video signals circulated through said delay means; means coupled to said detecting means for generating a transmission signal responsive to the location of each said first signal with respect to the start of the respective delayed one-line video signal; means coupling said second detecting means to said recirculating circuit means for erasing said first signal from each delayed one-line video signal recirculated through said delay means; and transmission means coupled to said transmission signal generating means.

2. The system of claim 1 further comprising means for sensing the absence of a signal having said predetermined level in said delayed one-line video signal circulated through said delay means and for providing a line-advance signal in response thereto, said sensing means coupled to said line and frame sweep generator means for actuating the same in response to said line-advance signal thereby to scan a new line of said image.

3. The system of claim 1 wherein said transmission signal generating means includes means for digitably encoding the location of each said first signal.

4. The system of claim 1 wherein said camera means include means for providing a bilevel video signal in said output circuit means, said predetermined level being one of said levels.

5. The system of claim 4 further comprising means coupled to said output circuit means of said camera tube means for detecting the presence of a signal in said one-line video signal having said one level and for generating a signal pulse having a predetermined duration in response thereto, thereby providing a modified one-line video signal formed of said signal pulses, said modified one-line signal being circulated thereby said delay means, said second detecting means detecting the delayed first signal pulse in each delayed modified one-line signal recirculated through said delay means.

6. The system of claim 1 further comprising means coupled to said output circuit means of said camera tube means for inserting a synchronizing signal at the start of each one-line video signal, said first detecting means including means coupled to said output end of said delay means for detecting said synchronizing signal in each said delayed one-line video signal circulated through said delay means.

7. The system of claim 1 wherein said transmission signal generating means includes timing signal generating means, selectively-actuable counting means coupled to said timing signal generating means for counting said timing signals, said first detecting means being coupled to said counting means for initiating a counting operating in response to the start of each said delayed one-line video signal, said second detecting means being coupled to said counting means for terminating the counting operation in response said first video signal in each said delayed one-line video signal whereby said counting means counts-down said timing signals during the interval between the start of each said delayed one-line signal and the said first video signal therein thereby to provide a count responsive to the location of each said first video signal, and means for generating a digitally encoded transmission signal in response to each said count.

8. The system of claim 1 wherein said camera means includes means for providing a bilevel video signal in said output circuit means, said predetermined level being one of said levels, and further comprising selectively actuable means for generating a synchronizing pulse, said synchronizing pulse generating means being coupled to said line and frame sweep generator means for actuating the same to initiate a said one-line video signal; means coupled to said output circulit means of said camera means for detecting the presence of a signal having said one level in said one-line video signal and for generating a signal pulse having a predetermined duration in response thereto thereby providing a modified one-line signal formed of said signal pulses; and means for inserting a said synchronizing pulse at the start of each said modified one-line signal, said input end of said delay means being coupled to said inserting means whereby said synchronizing pulse and modified one-line signal are circulated through said delay means, said first detecting means including means coupled to said output end of said delay means for detecting said synchronizing pulse in each delayed modified one-line signal, said second detecting means including means coupled to said output end of said delay means for detecting the first said signal pulse in each said delayed modified one-line signal, said erasing means erasing each said detected first signal pulse from the delayed modified one-line signal recirculated through said delay means.

9. The system of claim 8 wherein said transmission signal generating means includes clock pulse generating means, selectively actuable pulse counting means coupled to said clock pulse generating means for counting said clock pulses, means coupling said first detecting means to said counting means for resetting said counting means and initiating a pulse counting operation in response to each said delayed synchronizing signal, means coupling said second detecting means to said counting means for terminating each said counting operation in response to the first said delayed signal pulse in each said delayed modified one-line signal whereby said counting means counts-down said clock pulses during each interval between a delayed synchronizing pulse and the first said signal pulse in each said delayed modified one-line signal thereby to provide a pulse count responsive to the location of each said first signal pulse; and means for generating a digitally encoded transmission signal in response to each said count.

10. The system of claim 9 further comprising means for detecting the absence of a said signal pulse in a delayed modified one-line signal and for providing a line advance signal in response thereto, said last-named detecting means being coupled to said synchronizing pulse generating means for actuating the same to generate a new synchronizing pulse thereby to initiate a new one-line video signal.

11. The system of claim 10 wherein said counting means includes means for providing a digitally encoded pulse count on a plurality of parallel channels, said means for generating a digitally encoded transmission signal comprising parallel-to-series shift register means, gate means coupling said counting means channels to said shift register means in response to each said detected synchronizing pulse, and shift pulse generating means coupled to said shift register means.

12. The system of claim 1 further comprising image display means including line and frame scanning means and selectively actuable storage means; second selectively actuable line sweep generator means coupled to said line scanning means of said display means for energizing the same to scan predetermined portions of one line; second selectively actuable frame sweep generator means coupled to said frame scanning means of said display means for actuating the same to advance said line scanning by one increment; third means coupled to said transmission means for detecting each said transmission signal and for providing a location or signal in response thereto corresponding to the respective delayed first signal, said second sweep generator means being coupled to said third detecting means and actuated thereby to scan in one line to a display location corresponding to the location of the respective delayed first signal; said third detecting means being coupled to said storage means for actuating the same thereby to store said location signal therein.

13. The system of claim 12 further comprising means coupled to said output circuit means of said camera tube means for detecting the presence of a signal in said initial one-line video signal having said one level and for generating a signal pulse having a predetermined duration in response thereto thereby providing a modified one-line video signal formed of said signal pulses, said modified one-line signal being circulated through said delay means, said second detecting means detecting the first delayed signal pulse in each delayed modified one-line signal circulated through said delay means; and means coupled to said third detecting means for generating a location pulse having a predetermined duration in response to each said location signal said location pulse generating means being coupled to said second line sweep generator means to actuate the same to continue said scan in said one-line beyond said dipslay location for the duration of said location pulse.

14. The system of claim 13 further comprising second means coupled to said third detecting means for generating another pulse coincident with a respective location pulse but having a duration shorter than said location pulse in response to each said location signal; and means coupling said second pulse generating means to said storage means for actuating the same to store said other pulse therein.

15. The system of claim 12 wherein said transmission signal generating means includes means for generating a digitally encoded signal, and said third detecting means includes means for decoding said digitally encoded signal thereby to provide said location signal responsive to the location of the respective first signal.

16. The system of claim 12 wherein said transmission signal generating means includes means for generating a digitally encoded transmission signal comprising clock pulse generating means having a frequency such that the number of clock pulses generated during the duration of a said one-line video signal is equal to the number of picture elements in one line, pulse counting means coupled to said clock pulse generating means for providing a parallel digital pulse count in response thereto, means coupling said first detecting means to said counting means for initiating a pulse counting operation in response to the start of each said delayed one-line video signal circulated through said delay means, means coupling said second detecting means to said counting means for terminating a pulse counting operation in response to each said delayed first signal whereby a digital pulse count is provided responsive to the location of each said delayed first signal, first shift register means coupling said counting means to said transmission means for shifting out said digital pulse count in serially coded form thereby to provide said digitally encoded transmission signal, and first shift pulse generating means coupled to said shift register means; said third detecting means including means for decoding said digitally encoded signal comprising second shift register means coupled to said transmission means for converting said digitally encoded transmission signal to a corresponding parallel digital pulse count, said second shift pulse generating means being coupled to said second shift register means and having the same frequency as said first shift pulse generating means for shifting said digitally encoded transmission signals into said second shift register means, third shift pulse generator means coupled to said second shift register means for shifting-out said parallel digital pulse count, and means coupled to said second shift register means for converting said parallel digital pulse count to said location signal responsive to the location of the respective first signal.

17. The system of claim 16 wherein said converting means comprises second clock pulse generating means having the same frequency as said first-named clock pulse generating means, second pulse counting means coupled to said second clock pulse generating means for providing a parallel digital pulse count in response thereto, and coincidence detector means coupling said second clock pulse generating means and said second shift register means for providing said location in response to coincidence of the respective digital pulse counts.

18. The system of claim 17 further comprising means for initiating a pulse counting operation of said second counting means in response to each said third shift pulse, means for terminating said pulse counting operation of said second counting means in response to each said location signal, and means coupling said third detecting means to said second line sweep generating means for enabling the same to scan in said one line in response to each said second shift pulse and for disabling the same in response to each said location signal thereby to stop the scan at each said location.

19. The system of claim 18 wherein said camera means includes means for generating a bilevel video signal in said output circuit means, said predetermined level being one of said levels, and further comprising means coupled to said output circuit means for detecting the presence of a signal having said one level in said one-line video signal and for generating a first pulse having a duration equal to a first predetermined number of picture elements in response thereto, means coupled to said last-named means for generating a signal pulse in response to each said first pulse thereby providing a modified one-line video signal formed of said signal pulses, said modified one-line video signal being circulated through said delay means, said second detecting means detecting the first delayed signal pulse in each delayed one line modified signal circulated through said delay means; means coupled to said coincidence detecting means for generating a location pulse having a duration substantially equal to said first pulse in response to each said location signal, means coupling said location pulse generating means to said second line sweep generating means for disabling the same responsive to the termination of said location pulse; means coupled to said coincidence detecting means for generating a blanking signal having a duration equal to a second predetermined number of picture elements less than said first number in response to each said location signal; and means coupling said blanking signal generating means to said storage means for blanking the same in response thereto.

20. The system of claim 12 wherein said transmission signal generating means includes means for generating a digitally encoded transmission signal comprising first clock pulse generating means having a frequency such that the number of clock pulses generated during the duration of a said one-line video signal is equal to a predetermined number of picture elements in one-line, first pulse counting means coupled to said first clock pulse generating means for counting said clock pulses, said first detecting means being coupled to said first pulse counting means for initiating a counting operation in response to the start of each said delayed one-line video signal circulated through said delay means, said second detecting means being coupled to said first pulse counting means for terminating a counting operation in response to each said delayed signal thereby providing a first pulse count responsive to the location thereof, and means coupling said first pulse counting means to said transmission means for providing a digitally encoded transmission signal in response to each said pulse count; said third detecting means comprising means coupled to said transmission means for decoding said transmission signal and providing a second pulse count in response thereto corresponding to said first pulse count; second clock pulse generator means having a frequency such that the number of pulses generated during the duration of one complete continuous line scan of said display means is equal to said predetermined number of picture elements, second pulse counting means coupled to said second clock pulse generating means for counting said second clock pulses; means coupling said second pulse counting means and said decoding means for initiating a pulse counting operation in response to completion of a decoding operation; coincidence detecting means coupling said decoding means and said second pulse counting means for providing said location signal in response to the pulse count provided by said second pulse counting means equalling said second pulse count, means coupling said coincidence detecting means to said second pulse counting means for terminating a pulse counting operation in response to said location signal; means coupling said third detecting means to said second line sweep generating means for enabling the same to scan in one line in response to each initiation of a counting operation of said second pulse counting means and for disabling the same in response to each said location signal thereby to stop the scan at each said location.

21. A time-bandwidth reduction system for bi-level television comprising: selectively actuable line sweep generator means adapted to be coupled to camera means to actuate the same to scan one-line of an optical image thereby to provide an initial one-line video signal; input circuit means adapted to be coupled to said camera means for receiving said initial one-line video signal; signal delay means having a delay at least as long as the duration of said one-line video signal and having input and output ends; recirculating circuit means coupling said input and output ends of said delay means and forming a closed loop therewith for recirculating a signal therethrough; said input circuit means being coupled to said recirculating circuit means whereby a succession of delayed one-line video signals is provided following said initial signal; first means for detecting the start of each one of said one-line video signals; second means for detecting the first video signal having a predetermined one of said levels in each one of said one-line video signals; means coupled to said first and second detecting means for generating a transmission signal having a characteristic responsive to the location of each said first signal with respect to the start of the respective one-line video signal; and means for erasing said first signal from each said one-line video signal recirculated through said delay means whereby the second video signal having said one level because the first signal in the next successive delayed one-line video signal.

22. The system of claim 21 further comprising first means for coupling said erasing means to said recirculating circuit means, and second means for coupling said input circuit means to said recirculating circuit means between said first coupling means and said input end of said delay means.

23. A method of time-bandwidth reduction for bi-level television comprising the steps of: scanning one line of an optical image and generating an initial one-line bi-level video signal in response thereto; successively delaying said initial one-line video signal to provide a succession of delayed one-line video signals; detecting the start of each said one-line video signal; detecting the first video signal having one of said levels in each one of said one-line video signals; generating a transmission signal in response to the location of each said first signal with respect to the start of the respective one-line video signal; and erasing the said first signal from the respective one-line video signal prior to the next delay thereof whereby the second video signal having said one level becomes the first signal in the next successive delayed one-line video signal.

24. The method of claim 23 wherein said delaying step comprises recirculating said one-line video signal through delay means.

25. The method of claim 24 wherein said erasing step is performed on each successive delayed one-line video signal.

26. The method of claim 23 comprising the further steps of generating a synchronizing signal and inserting the same at the start of said initial one-line video signal, said step of detecting the start of each said one-line video signal comprising detecting said synchronizing signal.

27. The method of claim 23 comprising the further steps of sensing the absence of a signal having said one level in a said delayed one-line video signal, and scanning another line of said optical image in response thereto.

28. The method of claim 23 comprising the further steps of detecting the presence of a video signal having said one level in said initial one-line video signal and generating a signal pulse having a predetermined duration in response thereto thereby to provide a modified one-line video signal formed of said pulses, said delaying step comprising successively delaying said modified one-line video signal.

29. The method of claim 23 wherein said transmission signal generating step comprises generating a digitally encoded signal responsive to the location of each said first signal.

30. The method of claim 23 wherein said transmission signal generating step comprises initiating counting of a train of clock pulses responsive to the start of each said one-line video signal, terminating said counting responsive to each said first signal, and digitally encoding the number of pulses so counted.

31. The method of claim 23 comprising the further steps of transmitting said transmission sginal and receiving the same at a remote location, scanning an electron beam in one line in response to each said received transmission signal to a display location corresponding to the location of the respective first signal, and storing a signal at said last-named location.

32. The method of claim 31 comprising the further steps of detecting each said received transmission signal and generating a location signal in response thereto corresponding to the respective first signal, initiating said scanning in respose to said detecton and interrupting the same in response to said location signal, said storing step being in response to said location signal.

33. The method of claim 32 wherein said transmission signal generating step comprises generating a digitally encoded signal responsive to the location of each said first signal, and wherein said detecting step comprises decoding said digitally encoded signal.

34. The method of claim 32 wherein said transmission signal generating step comprises initiating counting of a train of clock pulses responsive to the start of each said one-line video signal, terminating said counting responsive to each said first signal whereby the number of pulses so counted corresponds to the location of the respective first signal, and generating a digitally encoded signal in response to the number of pulses so counted;

said detecting step comprising decoding each received digitally encoded signal and providing a corresponding pulse count in response thereto, initiating counting of a second train of clock pulses in response to completion of each said decoding step, detecting coincidence of the count of said second train of clock pulses with each said decoded pulse count and generating said location signals respectively in response thereto, said scanning being initiated in response to completion of the first decoding step, interrupted in response to each said location signal and resumed in response to completion of each successive decoding step.

35. The method of claim 32 comprising the further steps of detecting the presence of a video signal having said one level in said one-line video signal and generating a first signal pulse having a first predetermined duration in response thereto thereby to provide a modified one-line video signal; generating a second signal pulse having said first duration in response to each said location signal, said scanning being interrupted at the conclusion of each said second signal pulse, and generating a third signal pulse in response to each said location signal and having a duration shorter than said first duration, said storing step comprising storing said third signal pulse.

36. The method of claim 25 wherein said storing step includes extinguishing said beam in response to said third signal pulse.

References Cited

UNITED STATES PATENTS

| | | |
|---|---|---|
| 2,955,159 | 10/1960 | Jones. |
| 3,461,231 | 8/1969 | Quinlan. |

RICHARD MURRAY, Primary Examiner

A. H. EDDLEMAN, Assistant Examiner

U.S. Cl. X.R.

178—6